(12) United States Patent
Kabagambe et al.

(10) Patent No.: US 8,535,501 B2
(45) Date of Patent: Sep. 17, 2013

(54) ELECTRICAL CONTACT ARRANGEMENT FOR A COATING PROCESS

(75) Inventors: Benjamin Kabagambe, Allison Park, PA (US); James W. McCamy, Export, PA (US); Donald W. Boyd, Cheswick, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 338 days.

(21) Appl. No.: 13/015,626

(22) Filed: Jan. 28, 2011

(65) Prior Publication Data

US 2012/0193233 A1    Aug. 2, 2012

(51) Int. Cl.
  *C25D 13/12*    (2006.01)
(52) U.S. Cl.
  USPC ............ 204/511; 204/512; 204/622; 204/623
(58) Field of Classification Search
  USPC ................. 204/511, 512, 622, 623; 205/137; 118/621
  See application file for complete search history.

(56) References Cited

U.S. PATENT DOCUMENTS

| | | |
|---|---|---|
| 4,793,867 A | 12/1988 | Charles et al. |
| 5,588,989 A | 12/1996 | Vonk et al. |
| 5,904,820 A | 5/1999 | Brown et al. |
| 6,916,542 B2 | 7/2005 | Buhay et al. |
| 2009/0233071 A1 | 9/2009 | Medwick et al. |
| 2010/0242953 A1 | 9/2010 | Bhandari et al. |

FOREIGN PATENT DOCUMENTS

GB    1 209 298    10/1970

OTHER PUBLICATIONS

U.S. Appl. No. 12/813,537, filed Jun. 11, 2010, Orosz et al.
U.S. Appl. No. 12/911,189, filed Oct. 25, 2010, Kabagambe et al.
U.S. Appl. No. 12/709,091, filed Feb. 19, 2010, Thiel.
PCT Search Report, PCT/US2011/052248, filed Sep. 20, 2011, mailed Jul. 5, 2012.

*Primary Examiner* — Kishor Mayekar
(74) *Attorney, Agent, or Firm* — Andrew C. Siminerio (57) ABSTRACT

A protective coating is applied to the electrically conductive surface of a reflective coating of a solar mirror by biasing a conductive member having a layer of a malleable electrically conductive material, e.g. a paste, against a portion of the conductive surface while moving an electrodepositable coating composition over the conductive surface. The moving of the electrodepositable coating composition over the conductive surface includes moving the solar mirror through a flow curtain of the electrodepositable coating composition and submerging the solar mirror in a pool of the electrodepositable coating composition. The use of the layer of a malleable electrically conductive material between the conductive member and the conductive surface compensates for irregularities in the conductive surface being contacted during the coating process thereby reducing the current density at the electrical contact area.

20 Claims, 7 Drawing Sheets

This invention was made with Government support under Contract No. DE FC36-08GO18033 (DOE SOLAR POWER) awarded by the Department of Energy. The United States Government may have certain rights in this invention.

ELECTRICAL CONTACT ARRANGEMENT FOR A COATING PROCESS

NOTICE OF GOVERNMENT SUPPORT

This invention was made with Government support under Contract No. DE FC36-08GO18033 (DOE SOLAR POWER) awarded by the Department of Energy. The United States Government may have certain rights in this invention.

BACKGROUND OF THE INVENTION

1. Field of the Invention

The present invention relates to an electrical contact arrangement for a coating process, and more particularly, to an electrical contact arrangement for use, and method of using same, in combination with a flow curtain of an electrocoat (e-coat) process.

2. Discussion of the Presently Available Technology

In general, solar mirrors include a transparent substrate, e.g. a glass substrate having a solar reflective coating, e.g. a metal foil, or a coating having one or more solar reflecting films, on a surface of the glass substrate facing away from the sun. A coating is applied over the reflective coating to protective the reflective coating against mechanical damage, e.g. scratches and impact abrasion, and/or chemical attack, e.g. against oxidation and/or corrosion caused by rain and chemicals in the environment. There are different techniques that can be used to apply the protective coating over the reflective coating. One coating technique of interest in this discussion is the e-coating process. In one embodiment of the e-coating process, an electrode is positioned in a tank containing an electrodepositable coating composition. The solar mirror to be coated is connected to a first terminal of an electrical power supply, and the electrode in the electrodepositable coating composition is connected to a second terminal of the electrical power supply.

With the above arrangement, the e-coating process can be seen as an electrical circuit when an electrical current is applied to the electrode and the solar mirror. In this electrical circuit, the electrodepositable coating composition has a cationic or anionic charge while the electrically conductive surface of the reflective coating, which is to be coated, has a charge that is opposite to that of the electrodepositable coating composition i.e., the electrically conductive surface of the substrate and the electrically conductive liquid can be anionic or cationic, respectively. During the e-coating process, a complete electrical circuit is established by the power supply, e.g. a direct current rectifier thereby allowing the coating composition to deposit onto the oppositely charged surface of the reflective coating of the solar mirror.

Although the above described e-coat flow curtain process is acceptable, there is a limitation. More particularly, presently available contact devices do not compensate for the various contours of the solar mirrors to be coated. As a result, there is less than full surface contact between the contact surface of the devices and the contoured surface of the solar mirrors. This less than full surface contact results in a current density increase, which results in arcing. It has been observed that the arcing can damage, e.g. melt, the reflective coating of the solar mirror. As can be appreciated by those skilled in the art, it would be advantageous to provide an electrical contact device that provides full surface contact regardless of the surface contour of the solar mirror.

SUMMARY OF THE INVENTION

The present invention is directed to a coating apparatus for applying an e-coat over an electrically conductive contoured surface of an article. The apparatus includes, among other things, an arrangement for applying an electrodepositable coating composition having an electrical conductivity over the conductive contoured surface of the article, and an electrically conductive contact device including, among other things, a pair of jaw members biased toward one another, wherein at least one of the jaw members includes, among other things, an electrically conductive malleable material.

A method of applying an e-coat over an electrically conductive contoured surface of an article, the method includes, among other things, moving an electrodepositable coating composition having an electrical conductive over the electrically conductive contoured surface; providing a pair of jaw members; providing a layer of a malleable electrically conductive material on a surface of a first jaw member of the pair of jaw members; biasing the first jaw member against the electrically conductive surface of the article to bias the layer against the electrically conductive surface of the article; moving the electrodepositable coating composition over the conductive surface to establish a current path, wherein the current path comprises the electrodepositable coating composition, the conductive surface of the substrate, the layer and the first jaw member of the pair of jaw members, and moving an electric current along the current path to deposit the coating on the electrically conductive surface in contact with the electrodepositable coating composition.

BRIEF DESCRIPTION OF THE DRAWINGS

FIG. 13 includes FIGS. 13A and 13B on Sheet 8 of the drawings, and FIG. 13C on Sheet 6 of the drawings showing features of a segmented conduit used in the practice of the invention to coat a parabolic shaped solar mirror.

DETAILED DESCRIPTION OF THE INVENTION

As used herein, unless otherwise expressly specified, all numbers such as those expressing values, ranges, amounts or percentages are read as if prefaced by the word "about", even if the term does not expressly appear. When referring to any numerical range of values, such ranges are understood to include each and every number and/or fraction between the stated range minimum and maximum. For example, a range of "1 to 10" is intended to include all sub-ranges between (and including) the recited minimum value of 1 and the recited maximum value of 10, that is, having a minimum value equal to or greater than 1 and a maximum value of equal to or less than 10. As employed herein, the term "number" means one or an integer greater than one. Also, as used herein, the term "moved over" "applied over" and "deposited over" means moved, applied, and deposited on but not necessarily in surface contact with. For example, one surface, article, film or component "moved over" "applied over" and "deposited over" another surface, article, film or component of an article or apparatus does not preclude the presence of materials between the surfaces of the articles, or between components of the article or apparatus, respectively.

Before discussing non-limiting embodiments of the invention, it is understood that the invention is not limited in its application to the details of the particular non-limiting embodiments shown and discussed herein since the invention is capable of other embodiments. Further, the terminology used herein to discuss the invention is for the purpose of description and is not of limitation. Still further, unless indicated otherwise, in the following discussion like numbers refer to like elements.

In the practice of a non-limiting embodiment of the invention, an electrically conductive contact arrangement of the invention is used in a hybrid e-coat flow curtain process to deposit an electrodepositable coating composition, e.g. but not limited to an organic protective coating, over an electrically conductive surface of a reflective coating of a solar mirror. In one non-limiting embodiment of the hybrid e-coat curtain process of the invention, the conductive surface of the reflective coating of a solar mirror is coated by directing a liquid curtain of an electrodepositable coating composition onto the conductive surface and attaching a non-limiting embodiment of an electrically conductive contact arrangement of the invention to the conductive surface. A direct current power supply, e.g. a DC 500 volt rectifier is connected to the liquid curtain and the contact arrangement to establish an electric circuit to apply a coating, e.g. a protective coating on the conductive surface of reflective coating.

A limited discussion directed to the electrodepositable coating composition is now presented. A more detailed discussion of the electrodepositable coating composition is presented in U.S. patent application Ser. No. 12/813,537, now U.S. Pat. No. 8,277,626, filed on Jun. 11, 2010 in the name of Gary R. Orosz et al and titled "METHOD FOR DEPOSITING AN ELECTRODEPOSITABLE COATING COMPOSITION ONTO A SUBSTRATE USING A PLURALITY OF LIQUID STREAMS" and in U.S. patent copending application Ser. No. 12/911,189 filed on Oct. 25, 2010 in the name of Benjamin Kabagambe et al and titled "ELECTROCURTAIN COATING PROCESS FOR SOLAR MIRRORS", which documents in their entirety are hereby incorporated by reference.

As used herein, the term "cure" refers to a process wherein the crosslinkable components of a coating are at least partially crosslinked. In certain embodiments, the crosslink density of the crosslinkable components (i.e., the degree of crosslinking) ranges from 5% to 100%, such as 35% to 85%, or, in some cases, 50% to 85% of complete crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen.

Reference to any monomer(s) herein refers generally to a monomer that can be polymerized with another polymerizable component such as another monomer or polymer. Unless otherwise indicated, it should be appreciated that once the monomer components react with one another to form a compound, the compound will include the residues of such monomer components.

In one non-limiting embodiment of the invention, the electrodepositable coating composition includes a film-forming polymer and a curing agent that is capable of reacting with the film-forming polymer. A wide variety of film-forming polymers can be used so long as the film-forming polymers are "water dispersible." As used herein, "water dispersible" means that a material is adapted to be solubilized, dispersed, and/or emulsified in water. Examples of film-forming polymers suitable for use in the present invention, without limitation, resins or polymers derived from a polyepoxide, an acrylic, a polyurethane, a polyester, or combinations thereof. In certain embodiments, the film-forming polymer can include functional groups. As used herein, "functional groups" or "reactive functional groups" mean hydroxyl, carboxyl, carbamate, epoxy, isocyanate, aceto acetate, amine-salt, mercaptan, or combinations thereof. The film-forming polymer described above is also ionic in nature. Specifically, the film-forming polymers can be cationic or anionic. Therefore, in some embodiments, the film-forming polymer can include cationic salt groups, generally prepared by neutralizing a functional group on the film-forming polymer with an acid, which enables the film-forming polymer to be electrodeposited onto a cathode. For example, in some embodiments, a film-forming cationic polymer can be derived by first reacting a polyepoxide containing polymer with an amine, such as those described above, 1,5,7-triazabicyclo[5.5.0]dec-5-ene (TBD), sulfides, or combinations thereof, then reacting the polymer with an acid. Depending on the compound that is used to react with the epoxy functional polymer, the acid can either be added to the polymer after the polymer has been reacted with the amine, TBD, and/or sulfide or it can be added to the polymer in combination with these compounds. In certain embodiments, the "ionic compound" means the ionic film-forming polymer described above.

Although in the preferred practice of the invention, the electrodepositable coating composition is applied to the conductive surface of the reflective coating of a solar mirror as a flow curtain, the invention is not limited thereto, and any liquid applying techniques known in the art can be used in the practice of the invention to apply the electrodepositable coating composition. For example, in one non-limiting embodiment of the invention, the various liquid materials can be sprayed applied onto the conductive surface; in another non-limited embodiment of the invention the article to be coated, e.g. a solar mirror and a curtain of the electrodepositable coating composition can be moved relative to one another to flow the liquid over the conductive surface of the solar mirror; further in another non-limiting embodiment of the invention, the solar mirror is dipped into a bath of the electrodepositable coating composition, and still further in another embodiment of the invention, the electrodepositable coating composition is applied using a roller having an electrically conductive surface electrically connected to the power supply.

In some embodiments of the invention, facilities for curing the electrodepositable coating composition can be positioned in the process such that the electrodepositable coating composition is substantially or completely cured after the coating composition is deposited onto the reflective coating. For example, in certain embodiments, the electrodepositable coating composition applied over a portion of the reflective coating can be exposed to a UV lamp after which the electrodepositable coating composition applied to the remaining portion of the reflective coating is exposed to the UV lamp. In other embodiments, the electrodepositable coating composition covering substantially all of the reflective coating is exposed to the UV lamp. While the preceding embodiments of the invention described a UV lamp as being used to cure the electrodepositable coating composition, other methods for curing the coating composition can be used depending on the particular chemistry of the electrodepositable coating composition. For instance and not limiting to the discussion, thermal heating/energy, infrared radiation, induction heating, electron beam radiation, and/or ionizing or actinic radiation can be used to cure the electrodepositable coating composition. In certain embodiments, the curing operation can be carried out at ambient temperatures. In other embodiments, the curing operation can be carried out at temperatures equal to or less than 260° C. In certain embodiments, the curing operation can be carried out at temperatures ranging between any combination of values less than 260° C. For example, the curing operation can be carried out at temperatures ranging from 120° C.-150° C. It should be noted, however, that lower or higher temperatures can be used as necessary to activate the curing mechanisms.

Figure 1:
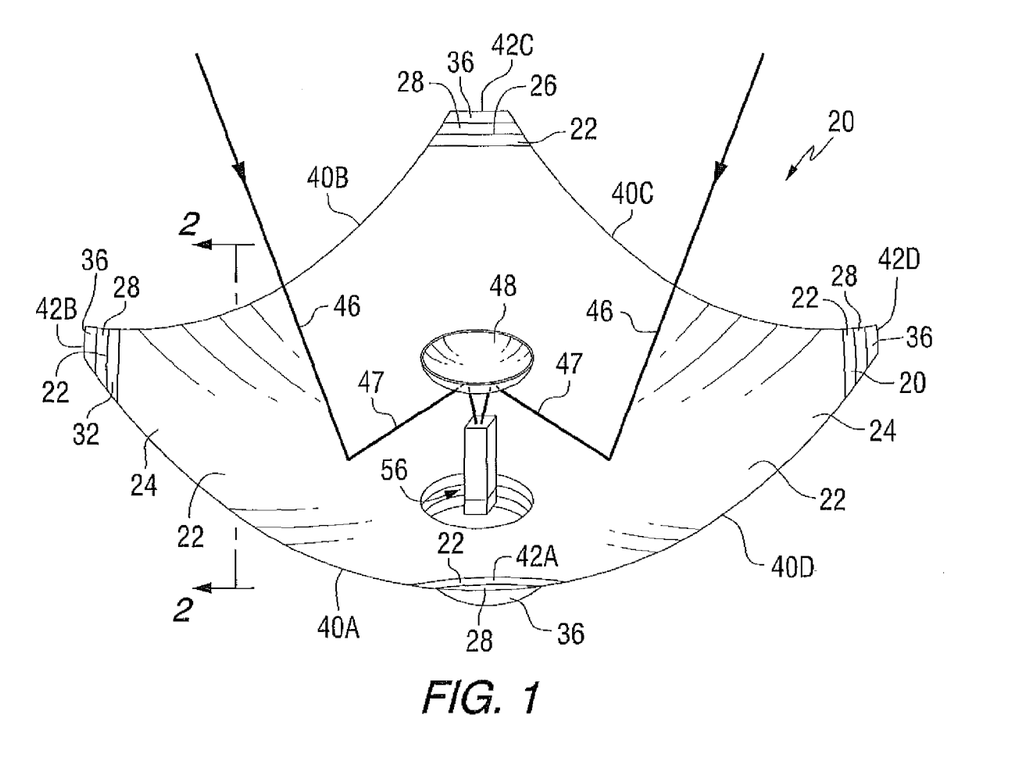
FIG. 1 is an isometric view of a parabolic solar mirror having a protective film applied in accordance to the teachings of the invention.

The discussion is now directed non-limiting embodiments of solar mirrors that can be coated using the contact device, and the coating process of the invention. As is appreciated, the invention is not limited to the shape of the solar mirror and any of the shapes of solar mirrors known in the art, e.g. but not limited to a parabolic shaped solar mirror, a flat mirror and a trough shaped mirror can be used in the practice of the invention. Shown in FIG. 1 is a non-limiting embodiment of a parabolic shaped solar mirror 20 having a transparent substrate 22, e.g. but not limiting to the invention a soda-lime-silicate glass having a first surface 24 facing the sun (not shown), and an opposite surface or second surface 26. In the instance when the solar mirror 20 is a parabolic shaped solar mirror, the first surface 24 is the concave surface, and the second surface 26 is the convex surface. A reflective coating, layer or film 28 is applied to the second surface 26 (clearly shown in FIG. 2) of the substrate 22 to reflect the sun's rays to a focal point or focal area. The solar reflective coating 28 is usually an opaque film to reduce transmission losses while increasing reflection of the solar energy. Further, the reflective coating 28 is usually electrically conductive because it includes a metal layer or film, e.g. but not limited to silver, aluminum, nickel, stainless steel or gold to enhance the reflectivity of the solar energy. The reflective coating 28 can be applied to the surface 26 of the substrate 22 in any usual manner, e.g. but not limited to adhering a metal foil to the convex surface 26, electroless coating, roll or brush painting, chemical vapor deposition, or magnetron sputtering vacuum deposition ("MSVD").

Figure 2:
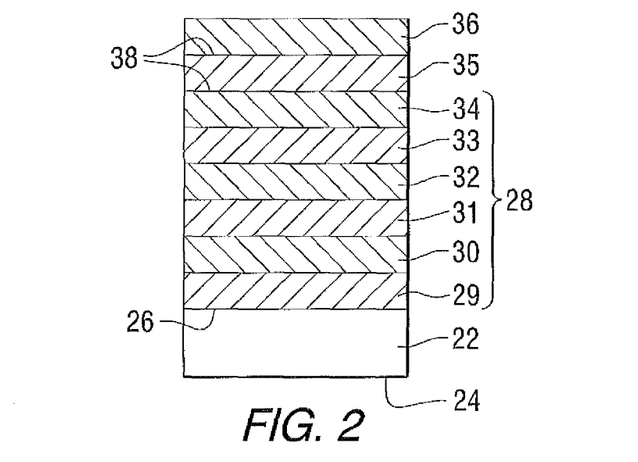
FIG. 2 is a view taken along lines 2-2 of FIG. 1.

In the non-limited embodiment of the invention under discussion, the reflective coating 28 was an MSVD coating including a plurality of films, which includes one or more metal films and one or more dielectric films. With reference to FIG. 2, the reflective coating 28 included a titanium dioxide film 29 over or on surface 26 of the glass substrate 22; a silver film or layer 30 over or on the titanium dioxide film 29; a nickel containing film or layer 31 over or the silver film 30; a titanium dioxide film or layer 32 over or on the nickel containing film 31; a zinc stannate film or layer 33 over or on the titanium dioxide film 32, and a permanent protective overcoat ("PPO") film or layer 34 over or on the zinc stannate film 33. A discussion of the films of the reflective coating 28 used in, and additional coatings that can be used in, the practice of the invention can be found in U.S. patent copending application Ser. No. 12/330,580 filed on Dec. 9, 2008 and titled REFLECTIVE COATING, now U.S. Patent Application Publication No. U.S. 2009/0233071A1, which documents in their entirety, are hereby incorporated by reference.

The PPO film 34 protects the underlying films 29-33 against mechanical damage, e.g. scratches and impact abrasion during the forming and shaping of the glass substrate 22 and against chemical attack during storage of the coated substrate. PPO films 34 that were used in the practice of the invention, but not limited to the invention are of the type disclosed in U.S. Pat. No. 6,916,542, which patent in its entirety is hereby incorporated herein by reference.

It is also understood that, in some embodiments of the invention, the reflective coating 28 can include films of different metals. Although not limiting to the invention, to prevent galvanic action between the different metals of the reflective coating 28, a sacrificial metal film 35 can be provided on or over the reflective coating 28. Any metals used and/or known in the art as sacrificial metals can be used in the practice of the invention, e.g. but not limited to zinc, aluminum, tin and iron. The electrically conductive film 35 can be applied in any usual manner, e.g. applied by electroless coating deposition, roll or brush painting, chemical vapor deposition, or magnetron sputtering vacuum deposition ("MSVD"). In the preferred practice of the invention, a zinc film 35 is applied over or on the PPO film 34. A more detailed discuss of primer films or layers, e.g. a zinc containing primer film or layer that can be used in the practice of the invention is described in U.S. Pat. Nos. 4,793,867 and 5,588,989, which patents are hereby incorporated by reference.

A protective e-coat, layer or film 36 is applied in accordance to the teachings of the invention on or over the reflective coating 28, or on or over the zinc primer film 34. In the following discussion, the term "electrically conductive surface" is used to identify the surface on which the protective coating 36 is applied and is identified by the number 38. In the practice of the invention, the electrically conductive surface 38 can be outer surface of the reflective coating 28, e.g. the surface of the PPO film 34 facing away from the convex surface 26 of the substrate 22 of the solar mirror 20, or can be the outer surface of the zinc film 35, i.e. the surface of the zinc primer film 35 facing away from the convex surface 26 of the substrate 22 of the solar mirror 20, as shown in FIG. 2. More particularly, and not limiting to the invention, if galvanic action is not an expected problem, the zinc film 35 is omitted and the conductive surface 38 is the surface of the PPO film 34 farthest from the convex 26 surface of the substrate 22. On the other hand, if galvanic action is an expected problem, the film 35, e.g. zinc film is present, and the conductive surface 38 is the surface of the zinc film 35 farthest from the convex surface 26 of the substrate 22.

As can be appreciated, the invention is not limited to the manner in which the glass substrate 22 of the solar mirror 20 is shaped and coated with the reflective film 28, and any of the methods known in the art can be used in the practice of the invention. In one non-limited embodiment of the invention, the parabolic solar mirror 20 is made by shaping a square flat glass substrate having the reflective coating 28. Portions of the periphery of the shaped glass substrate are removed to provide four radiused sides 40A-D and four linear sides 42A-D for arranging a plurality of the solar mirrors 20 in a side by side relationship in an array. For a more detailed discussion of the process for making the solar mirror 20, reference can be made to U.S. patent copending application Ser. No. 12/709,091 filed on Feb. 19, 2010 in the name of James P. Thiel and titled A SOLAR REFLECTING MIRROR AND METHOD OF MAKING SAME, and in U.S. patent copending application Ser. No. 12/709,045 filed on Feb. 19, 2010 in the name of Abhinav Bhandari et al and titled SOLAR REFLECTING MIRROR HAVING A PROTECTIVE COATING AND METHOD OF MAKING SAME. The forgoing patent applications in their entirety are hereby incorporated herein by reference.

With continued reference to FIG. 1, the parallel solar energy rays represented by rays 46 are incident on the concave surface 24 of the shaped glass substrate 22. The solar energy rays are shown in FIG. 1 as two single rays 46 for purpose of clarity and simplicity instead of the infinite number of parallel solar energy rays incident on the concave surface 24. A portion 47 of the rays 46 is reflected from the concave surface 24 of the mirror 20 to a secondary mirror 48, and a portion (not shown) of the rays 46 pass through the concave surface 24 to the convex surface 26. For a detailed discussion of internally reflected light rays within a glass body, reference can be made to the above-mentioned U.S. patent copending application Ser. No. 12/709,045.

In the non-limiting embodiment of the invention shown in FIG. 1, the rays 47 are incident on the secondary mirror 48 positioned at the focal point or focal area of the shaped mirror 20. The rays 47 are incident on the secondary mirror 48 and are reflected from the secondary mirror 48 to an energy converter 56. The secondary mirror 48 is similar to the mirror 20 except that the secondary mirror 48 can be a flat mirror, or a mirror having a radiused surface. In another embodiment of the invention, the energy converter 56 is positioned at the focal point or focal area of the shaped solar mirror 20 to eliminate the secondary mirror 48. As can be appreciated the invention is not limited to the energy converter 56, and the converter 56 can be any of the types used in the art to receive solar energy and convert the solar energy to electric energy or thermal energy.

Figures 3, 4, 5:
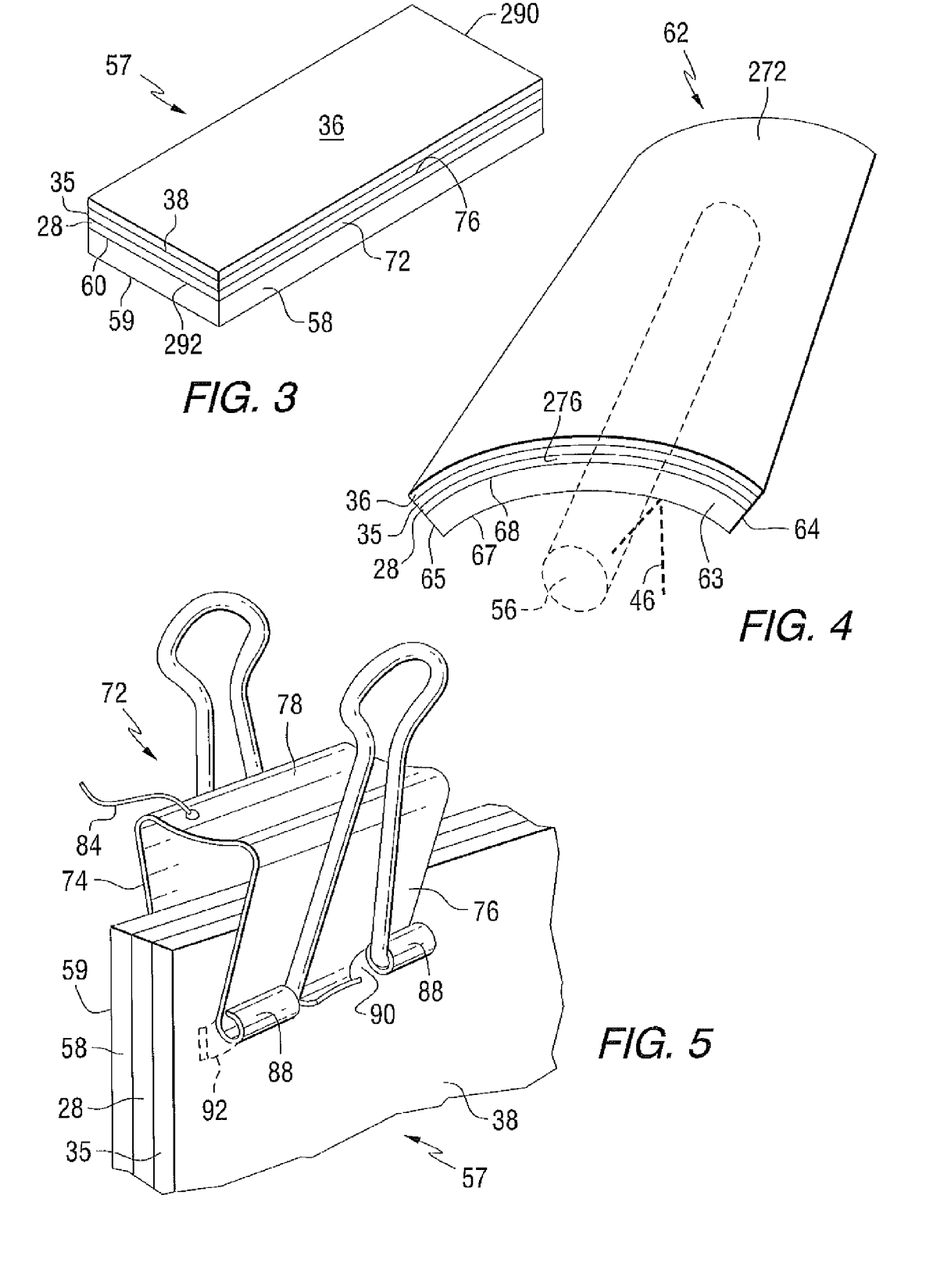
FIG. 3 is an isometric view of a flat solar mirror having a protective film applied according to the invention.
FIG. 4 is an isometric view of a trough shaped solar mirror having a protective film applied according to the teachings of the invention.
FIG. 5 is an isometric view of a non-limiting embodiment of an electrically conductive contact arrangement of the invention mounted on a section of a flat solar mirror.

With reference to FIG. 3 there is shown a non-limiting embodiment of a flat solar mirror 57 that can be used in the practice of the invention. The flat mirror 57 includes, among other things, a transparent substrate 58, e.g. a soda-lime-silicate glass substrate 58 having a pair of parallel flat major surfaces 59 and 60. The reflective coating 28 is on one of the major surfaces, e.g. on the major surface 60 of the glass substrate 58. The protective coating 36 is applied in accordance to the teachings of the invention to the electrically conductive surface 38, e.g. the surface of the zinc film 35 farthest from the major surface 60 of the substrate 58.

With reference to FIG. 4 there is shown another non-limiting embodiment of a trough mirror 62 that can be used in the practice of the invention. The trough mirror 62 includes, among other things, a trough shaped transparent substrate 63, e.g. a soda-lime-silicate glass substrate 63 having a C-shaped cross section as shown in FIG. 4, elongated opposite sides 64 and 65, a concave surface 67 and a convex surface 68. The reflective coating 28 is over the convex surface 68, and the concave surface 67 is shaped to reflect the sun's rays 46 (only one ray shown in FIG. 4 and shown in phantom), as discussed above regarding FIG. 1 to the energy converter 56 at the longitudinal axis of the substrate 63 or the focal area of the concave surface 67 of the solar trough mirror 62.

As is appreciated by those skilled in the art, the surface 24 of the parabolic solar mirror 20, the surface 59 of the flat solar mirror 57, and the concave surface 67 of the solar trough mirror 62 are uncoated surfaces, and glass below the temperature of 1100° Fahrenheit is electrically non-conductive. In the instance when an electrically conductive coating is applied to the surfaces 24, 59 and 67, the surfaces 24, 59 and 67 are electrically isolated from the surfaces 26, 60 and 68 of the solar mirrors 20, 57 and 62, respectively in any convenient manner. For example and not limiting to the discussion by covering the surfaces 24, 59 and 67 with an electrically insulating tape or maintaining the electrodepositable coating composition confined to the conductive surface 38.

Figure 6:
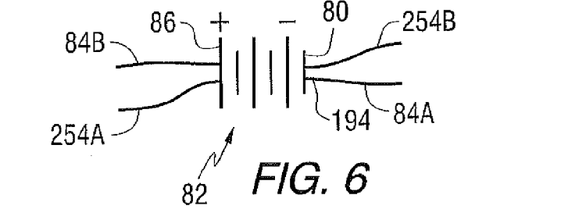
FIG. 6 is a schematic of an electrical system that can be used in the practice of the invention.

In one non-limiting embodiment of the invention, a protective coating 36 was applied to the conductive surface 38 of the zinc film 35 of the flat solar mirror 57 (see FIG. 3) in the following manner. A binder clip 72, e.g. of the type shown in FIG. 5 and sold by ACCO Office Products was connected to the mirror 57. More particularly, leg 74 of the clip 72 was biased against the surface 59 of the glass substrate 58, and leg 76 of the clip 72 was biased against the electrically conductive surface 38 of the zinc film 35 on the reflective coating 28. Center leg 78 of the binder clip 72 was connected to negative pole 80 of a 500 direct current rectifier 82 (see FIG. 6) by wire 84A. A flow curtain (flow curtains discussed in detail below) of electrodepositable coating composition 112 POWER-CRON® 935 cationic acrylic electrocoat paint (available from PPG Industries, Inc., Pittsburgh, Pa., USA) was connected to the positive terminal 86 of the rectifier 82. The 112 POWERCRON® 935 cationic acrylic electrocoat paint and the binder clip were spaced from and out off contact with one another to flow the electric current of the rectifier 82 through the conductive surface 38.

A voltage was applied to the electric system (the electric system included the flow curtain of the electrodepositable coating composition, the binder clip 72 and the portion of the conductive surface between the flow curtain and the binder clip) to apply the protective coating 36 (not shown in FIG. 5, see FIG. 2) to the conductive surface 35 over which the electrodepositable coating composition flowed. More particularly, the coating was initiated at an end of the solar mirror spaced from the binder clip. The solar mirror was moved through the flow curtain to the opposite end of the solar mirror while flowing the electrodepositable coating composition over the conductive surface and the binder clip 70. Arcing was observed during the coating process and after the binder clip 72 was removed from the mirror 57, it was observed that the conductive surface 38 contacted by the leg 76 of the clip 72 was melted.

The area of the conductive surface 38 under the leg 76 of the binder clip 72 was coated by applying the leg 76 of the binder clip 72 to the protective film 35 and flowing the electrodepositable coating composition over the uncoated area.

It was surmised that the arcing and melting of the conductive surface 38 under the leg 76 of the binder clip 72 was the result of edge 88 of the leg 76 of the binder clip 72 having a circular surface and having missing portion 90, which increased the current density applied to the conductive surface 38.

A second non-limiting embodiment of the invention was practiced by providing a layer 92 of a malleable material or paste (shown in phantom in FIG. 5) having conductive carbon of the type sold MG Chemicals 846-80G between the conductive surface 38 and the leg 76 of the binder clip 72 to fill in the areas 90 with the layer 92. The above coating process was repeated. There was no arcing observed and when the binder clip was removed, the conductive surface 35 under the layer 92 was not melted, e.g. the conductive surface had a pristine appearance. It was appreciated that increasing the contact area decreased the current density, and that increasing the contact area of the leg 76 of the binder clip 72 would eliminate the need for the layer 92. This approach would be acceptable for solar mirrors that have parallel flat surfaces, but would not be acceptable for solar mirrors that have curved nonparallel surfaces, e.g. parabolic shaped solar mirrors. Another factor to consider was the variation in the coating thickness of the reflective coating 28 and of the zinc film 35. Still another factor is the expense of shaping the contact surface of the contact device to provide a contact device for each of the different shapes of solar mirrors, e.g. different shapes of the convex surface 26 of the glass substrate 22 of parabolic shaped solar mirrors 20.

Figure 7:
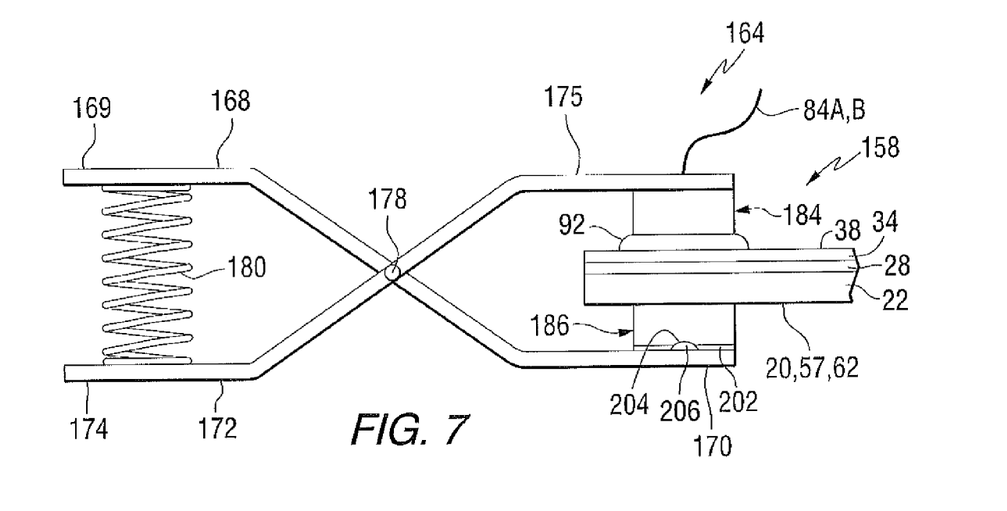
FIG. 7 is a side elevated view of another non-limiting embodiment of an electrically conductive contact arrangement of the invention mounted on a section of a solar mirror in accordance to the teachings of the invention.
Figure 8:
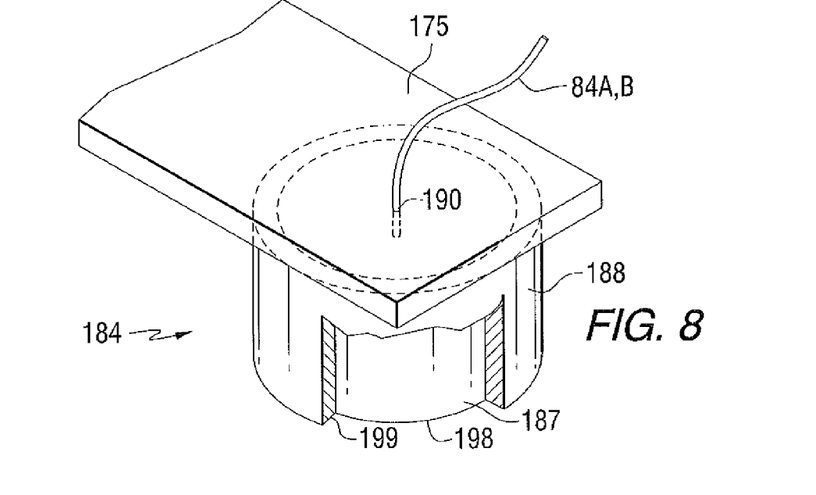
FIG. 8 is a view of the contact member of the electrically conductive contact arrangement of FIG. 7 having portions removed for purposes of clarity.
Figure 9:
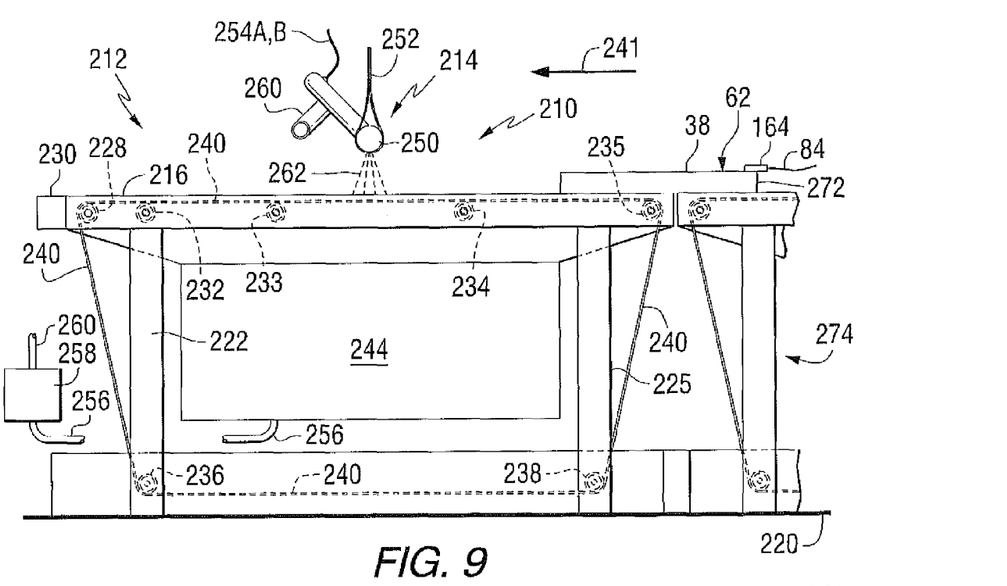
FIG. 9 is a side elevated view of a conveyor having a coating station, the conveyor and coating station incorporating features of the invention.

With reference to FIGS. 7-9 as needed, there is shown a non-limiting embodiment of an electrically conductive contact arrangement 158 of the invention to electrically connect the direct current rectifier 82 (see FIG. 6) to the electrically conductive surface 38 of the solar mirror 20 (FIG. 1), 57 (FIG. 3) and 62 (FIG. 4). The arrangement 158 includes the layer 92 and a clamping or contact device 164. With reference to FIG. 7, the clamping device 164 has a first arm 168 having end portions 169 and 170, and a second arm 172 having end portions 174 and 175. The arms 168 and 172 are connected at pivot point 178, and a spring 180 is positioned between the end portions 169 and 174. With this arrangement, moving the end portions 169 and 174 of the arms 168 and 172, respectively toward one another against the biasing action of the spring 180 moves the end portions 170 and 175 of the arms 168 and 172, respectively away from one another, e.g. to move the end portions 170 and 175 away from the solar mirror, and moving the end portions 169 and 174 of the arms 168 and 172, respectively away from one another, e.g. by the biasing action of the spring 180 moves the end portions 170 and 175 of the first and the second arms 168 and 172, respectively toward one another, e.g. against the solar mirror. The end portion 175 of the second arm 172 has a contact member 184, and the end portion 170 of the arm 168 has a support plate 186.

Referring now to FIG. 8, the contact member 184 of the contact device 164 includes a structurally stable electrically conductive disc 187, e.g. but not limiting to the invention a metal disc 187. The disc is mounted in an open ended electrically non-conductive housing 188, e.g. but not limited to a plastic housing 188 to prevent the electrodepositable coating composition from depositing on the conductive disc 187. The disc 187 in one non-limiting embodiment of the invention is made of aluminum, steel, silver or gold. An end 190 of the electric wire 84 is connected to the disc 187, and opposite end 194 of the wire 84 is connected to a terminal, the rectifier 82 (see FIG. 6). When the end 194 of the wire 84 is connected to the negative terminal 80 of the rectifier 82, the wire 84 is designated 84A; when the wire 84 is connected to the positive terminal 86, the wire 84 is designated 84B. Surface 198 of the disc 187 faces open end 199 of the housing 188 and is aligned with the open end 199 of the housing 188 or slightly recessed within the open end 199.

The support plate 186 (see FIG. 7) is made of structurally stable material that does not mar the surface of the glass substrate 22, e.g. made of plastic sold under the trademark Teflon. The surface 202 of the plate 186 has a circular recess 204 to capture the plate 186 on spherical nib 206 of the end portion 170, e.g. a ball joint arrangement. With this arrangement, the plate 186 can pivot to adjust to the curvature of the surfaces of the solar mirror, e.g. the surfaces 24 and 26 of the substrate 22 of the solar mirror 20 (see FIG. 1).

As can be appreciated, the mechanical contact device 164 of the invention can be made of any structurally stable material, however in the practice of the invention, it is preferred that all of the parts of the mechanical clip 164 except for the disc 187 and the metal wire 84 are made of electrically non-conductive material, e.g. plastic or wood or made of electrically conductive material and covered with electrically non-conductive material, e.g. a plastic coating.

With reference to FIG. 7, the layer 92 of the malleable material provides 100% surface contact with the electrically conductive surface 38 of the solar mirror and a seal to cover the open end of the housing 188 to prevent the electrodepositable coating composition from coating the surface 198 of the contact disc 187. In a non-limiting embodiment the invention, the layer 192 can remain on the electrically conductive surface 38 and provide protection to the underlying portion of the reflective surface; however, as can be appreciated, the layer 192 is not expected to provide a level of protection, e.g. durability that is provided by the protective layer 35.

As used herein, the term "malleable" means that the material or paste has a viscosity and thickness such that the applied biasing force, e.g., the force of the spring 180 acting on the material or paste provides a continuous layer of material or paste having a thickness greater than zero between the conductive surface 38 of the reflective coating and the conductive clip, e.g., the surface 198 (see FIG. 8).

In the practice of the invention, the contact surface 198 of the conductive disc 187 of the contact device 164 (see FIG. 8) is sized to provide a contact area (1) that is large enough to avoid arcing, (2) that is small enough to reduce uncoated area of the conductive surface after the first pass of the coating process, and (3) that can be used on articles or substrates, e.g. but not limited to solar mirrors having opposed flat surfaces, e.g. the surfaces 59 and 60 of the flat solar mirror 57 shown in FIG. 3 and having one or more shaped opposed surface, e.g., the surfaces 67 and 68 of the solar trough mirror 62 shown in FIG. 4 and the surfaces 24 and 26 of the parabolic mirror 20 shown in FIG. 1. As is appreciated by those skilled in the art, increasing the electric current for a given time period increases the thickness of the protective coating 36 (see FIG. 2) deposited on the electrically conductive surface 38. In one non-limiting embodiment of the invention, the thickness of the protective coating 36 is in the range of 20-40 microns; the current to provide the coating thickness of 20-40 microns is 0.3 to 1.0 ampere, and the time period to provide the protective coating 36 in a thickness range of 20-40 microns in a current range of 0.3 to 1.0 ampere is 1.0 to 2.0 minutes. The current density to avoid arcing in the current range of 0.3 to 1.0 ampere is 0.1 to 0.5 ampere/square inch. The area of the contact surface varies as the size of the coating area varies. For example but not limiting to the invention for coating areas of greater than 0 and less than 48 square inches, the contact area is in the range of greater than 0 to 3 square inches, and for coating areas of 48 to 96 square inches, the contact area is in the range of greater than 3 to 6 square inches.

EXAMPLES USING THE INVENTION

In the following examples of non-limiting embodiments of the invention, the electrically conductive contact arrangement 158 of the invention is used in combination with a flow curtain of a liquid electrodepositable coating composition to apply the protective coating 36 to the conductive surface 38 of the reflective coating 28 of a solar mirror (see FIG. 2). The flow curtain methods, devices and apparatuses discussed below are discussed in more detail in U.S. patent application Ser. No. 12/813,537, now U.S. Pat. No. 8,277,626, filed on Jun. 11, 2010 and in U.S. patent copending application Ser. No. 12/911,189 filed on Oct. 25, 2010.

Figure 10:
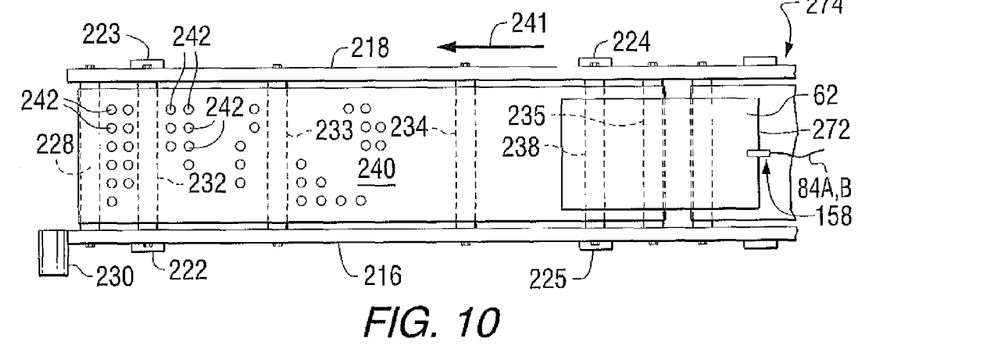
FIG. 10 is a plan view of the conveyor having the coating station removed for purposes off clarity.

With reference to FIGS. 9 and 10 as needed, there is shown a coating station 210 having a belt conveyor 212 and a coating arrangement 214. The belt conveyor 212 has a pair of horizontal beams 216 and 218 supported above the floor 220 by vertical struts 222-225, and a cylindrical roller 228 powered by a motor and gear arrangement 230. A plurality of upper cylindrical idler rollers 232-235 are positioned between the horizontal beams 216 and 218; a first lower cylindrical idler roller 236 is positioned between the struts 222 and 223, and a second lower cylindrical idler roller 238 is positioned between the struts 224 and 225 (see FIG. 10). An endless conveying belt 240, i.e. a conveying belt that has no ends, or has the ends joined together is driven by the powered roller 228 and has a path defined by the powered roller 228 and the idler rollers 232-236 and 238. The conveyor belt 240 is moved in a counterclockwise direction as viewed in FIG. 9 to move the solar mirror 62 (FIG. 4) having the contact arrangement 158 of the invention in the direction of arrow 241 toward and through the coating arrangement 214.

The conveying belt 240 preferable has electrically non-conductive surfaces so as not to short the electric circuit of the coating process; more particularly, the conveying belt 240 can be a plastic belt or a belt having a metal core encapsulated in a plastic sheath. Further, the conveyor belt 240 preferably has spaced holes 242 (shown only in FIG. 10) for passing unused liquid electrodepositable coating composition through the conveyor belt 240 into a polyethylene collection tank 244 positioned within the path on of the conveyor belt 240, e.g. below the upper idler rolls 232-235 and above the lower idler rolls 236 and 238 as shown in FIG. 9.

The coating arrangement 214 mounted above the conveyor belt 240 includes an electrically conducting conduit 250, e.g. but not limited to a metal conduit 250 mounted above the belt conveyor 240 (see FIG. 9) in any usual manner, e.g. but not limiting to the invention by one or more suspension rods 252 (only two shown in FIG. 9), e.g. plastic suspension rods. A wire 254 electrically connects the metal conduit 250 to the rectifier 82 (see FIG. 6). The wire 254 is designated 254A when the wire is connected to the positive terminal 86 of the rectifier 82 (see FIG. 6), and the wire 254 is designated 254B when the wire is connected to the negative terminal 80 o the rectifier 82. In the practice of the invention, when the electrodepositable coating composition is cationic, the metal conduit 250 is connected by the wire 254A to the positive terminal 86 of the rectifier 82 and the conductive disc 187 of the electrically conductive contact arrangement 158 is connected by the wire 84A to the negative terminal 80 of the rectifier 82. Further, when the electrodepositable coating composition is anionic, the metal conduit 250 is connected by the wire 254B to the negative terminal 80 of the rectifier 82 and the conductive disc 187 of the electrically conductive contact arrangement 158 is connected by the wire 84B to the positive terminal 86 of the rectifier 82. As is appreciated by those skilled in the art, when the wire 254A is connected to the positive terminal 86, the wire 254A is disconnected from the rectifier; when the wire 254B is connected to the negative terminal 80, the wire 254A is disconnected from the rectifier; when the wire 84A is connected to the negative terminal, the wire 84B is disconnected from the rectifier, and when the wire 84B is connected to the positive terminal, the wire 84A is disconnected from the rectifier.

In the non-limiting embodiment of the invention presently under discussion, the conduit 250 and the collection tank 244 are connected by way of a first pipe 256 providing fluid communication between the collection tank 244 and system regulating devices 258, and a second pipe 260 providing fluid communication between the system regulating devices 258 and the conduit 250. The system regulating devices 258 include flow control devices, filters, and pumps to provide a controlled flow of the liquid electrodepositable coating composition to the conduit 250 to flow a continuous flow curtain 262 from the conduit 250 to the conductive surface 38 of the reflective coating 28 of the solar mirror being coated. More particularly, the system regulating devices 258 regulate the flow of the electrodepositable coating composition to the conduit 250; remove unwanted materials from the electrodepositable coating composition collected in the tank 244, and provide pressure to have a constant flow of the electrodepositable coating composition exiting the conduit 250. As can be appreciated the invention is not limited to the system regulating devices 258 and any regulating or liquid control devices, or filtering arrangements known in the art can be used in the practice of the invention.

Figure 11:
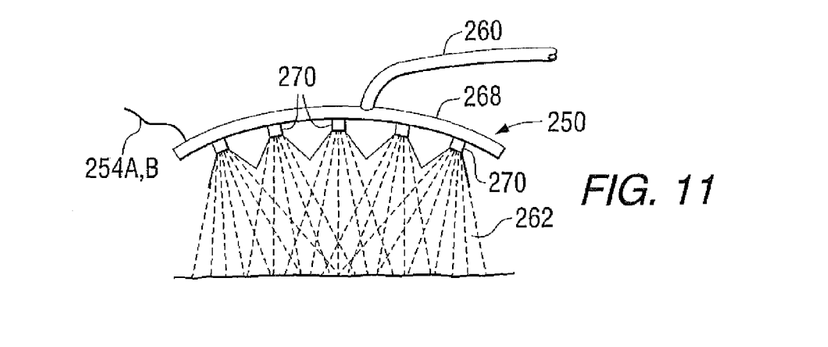
FIG. 11 is an elevated side view of a conduit used in the practice of the invention to provide a coating flow curtain to apply a protective film over the reflective coating of a shaped solar mirror in accordance to the teachings of the invention.

In EXAMPLE 1, the protective e-coat film 36 is deposited on the conductive surface 38 of the zinc film 35 on the reflective coating 28 of the trough shaped solar mirror 62 (see FIGS. 2 and 4). The electrodepositable coating composition is applied using the conduit 250 shown in FIG. 11. The conduit 250 includes a pipe 268 shaped to generally correspond to the shape of the convex surface 68 of the substrate 63 of the trough shaped solar mirror 62. A plurality of nozzles 270 are mounted on the pipe 268 and spaced from one another. The metal pipe 268 is connected by the wire 254A to the positive terminal 86 of the rectifier 82, e.g. a 500 volt rectifier 82, and the polypropylene collection tank 244 is filed with 112 POWERCRON® 935 cationic acrylic electrocoat paint (available from PPG Industries, Inc., Pittsburgh, Pa., USA). A ⅛ inch thick layer 92 of a malleable electrically conductive paste of the type sold by MG Chemicals is applied to the surface 198 of the disc 187 of the contact member 184 (see FIGS. 7 and 8). The conductive disc 187 is connected by wire 84A to the negative terminal 80 of the 500 volt rectifier 82 (see FIG. 6). The contact device 158 is mounted on one end of the trough shaped solar mirror 62, e.g. end 272 with the layer 92 between and electrically connecting the conductive surface 38 of the zinc film 35 and the surface 198 of the disc 187 of the contact member 184 (see FIGS. 7 and 8).

As can now be appreciated by those skilled in the art the composition of the layer 160 should not contain any ingredients, e.g. grease that will be detrimental to the electrodepositable coating composition.

The solar mirror 62 is moved from feed conveyor 274 onto the conveyor belt 240 of the conveyor belt 212. Leading end 276 of the solar mirror 62 is preferably opposite to the end 272 of the solar mirror having the contact device 164. The leading end 276 of the solar mirror 62 moves under the flow curtain 262 to close the circuit and flow electric current from the positive terminal 86 of the rectifier 82, to the pipe 268 of the conduit 250, to the flow curtain 262, to the clamping device 164 to the negative terminal 80 of the rectifier 82. With the electric circuit closed, the protective layer 36 is applied to the conductive surface 38 (see FIG. 2). In one non-limiting embodiment of the invention, the solar mirror is moved through the flow curtain 262 (see FIG. 9). Thereafter the contact device 164 and the layer 92 are removed from the solar mirror, and the uncoated area beneath the layer 92 cleaned with an appropriate solvent, e.g. denatured alcohol. The contact device 164 and layer 92 are applied to the protective coating 35 in an area spaced from the uncoated area of the solar mirror 62 as discussed above, and the conveyor belt moved in a clockwise direction (in a direction opposite to the direction of the arrow 241 to move the end 272 of the solar mirror under the flow curtain 262 to coat the uncoated area of the conductive surface 38 that was under the layer 92, and to apply a second layer of the protective coating over the conductive surface 38 of the solar mirror. Optionally only the uncoated area can be coated, e.g. using an electrically conductive applicator.

Figure 12:
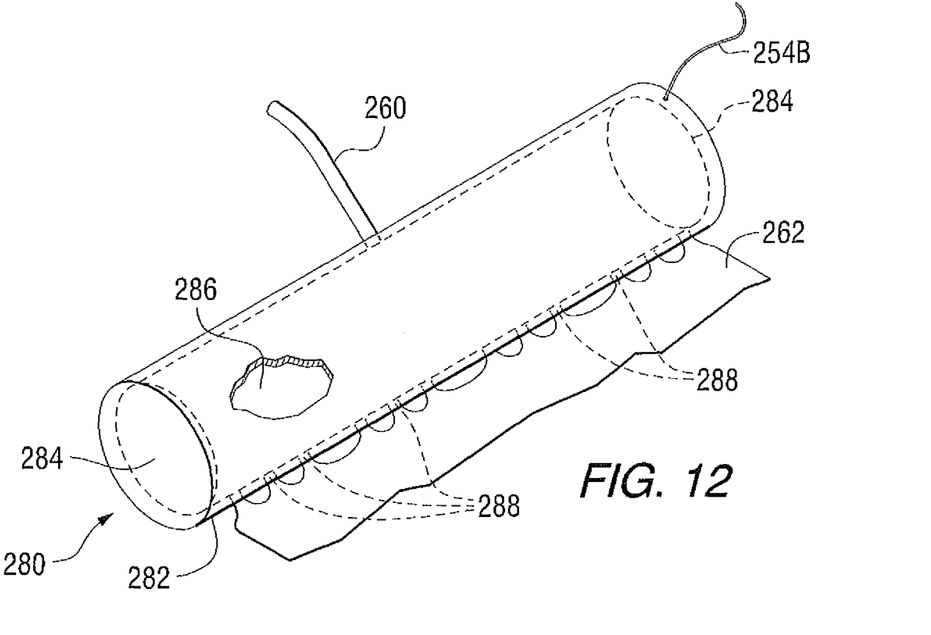
FIG. 12 is an isometric view of a conduit used in the practice of the invention to provide a coating flow curtain to apply a protective film over the reflective coating of a flat solar mirror in accordance to the teachings of the invention.

In Example 2 the protective film 36 is applied on the conductive surface 38 of the zinc film 35 over the reflective coating 28 on the substrate 58 of the flat solar mirror 57 shown in FIG. 3. In Example 2, the polypropylene collection tank 244 is filled with an anionic electrodepositable coating composition sold by PPG Industries, Inc. under the trademark AEROCRON. The electrodepositable coating composition is flowed through the pipe 256, the system regulating device 258, and the pipe 260 to conduit 280 shown in FIG. 12. The conduit 280 includes an elongated metal pipe 282 having closed ends 284 to provide an interior chamber 286 and having a series of holes or slots 288 drilled or formed preferably in a straight line along the length of the pipe 282. The holes 288 can have a diameter in the range 1 to 3 millimeters ("mm") and preferably but not limiting to the invention a diameter of 1.5 mm. The conduit 280 is mounted in the coating station 210 with the holes 288 of the pipe 282 facing the conveyor belt 240. The chamber 286 of the pipe 282 is connected by the pipe 260 to the system regulating device 258 (see FIG. 9). As can be appreciated, the invention contemplates having two or more pipes 260 each having it own system regulating device 258 or connected to a single system regulating device 258.

In Example 2, the metal pipe 282 of the conduit 280 is connected to the negative terminal 80 of the rectifier 82 by wire 254B and the contact device 164 of the contact arrangement 158 is connected to the positive terminal 86 of the rectifier 82 by the wire 84B. The contact device 164 is mounted to end 290 of the flat solar mirror 57 (FIG. 3) and opposite end 292 is the leading end. The solar mirror 57 is moved through the flow curtain 262 as previously discussed for the solar mirror 62 in Example 1. After the flat solar mirror 57 makes a first pass through the flow curtain 262, the solar mirror 57 is moved to a preparation area (not shown) where the contact device 164 and the layer 92 is removed from the end 290 of the solar mirror 57 and placed on the end 292 of the solar mirror 57. The uncoated electrically conductive surface is cleaned and the flat solar mirror 57 is placed on the conveyor belt 240 and the end 290 is the leading end as the solar mirror 57 makes a second pass through the flow curtain 262. After the second pass of the solar mirror 57 through the flow curtain 262, the contact device 164 and the layer 92 are removed from the end 292 of the flat solar mirror 57 and the area of the protective film 36 under the layer 92 is cleaned with denatured alcohol, and the solar mirror placed in a curing station to cure the protective coating 36.

Example 3 is the application of the protective coating 36 on the zinc film 35, which is over the reflective coating 28 of the parabolic solar mirror 20 (see FIG. 1). Example 3 uses the electrical arrangement and electrodepositable coating composition of Example 1. The solar mirror 20 shown in FIG. 1 has the four curved sides 40A-D and four linear sides 42A-D joining adjacent sides, e.g. the linear side 42A joins curved sides 40A and 40D. As shown in FIG. 1 the distance between the curved sides 40B and 40C increases as the distance from the linear side 42C increases. The maximum distance between opposite sides is realized between the linear sides 42A and 42C, and the linear sides 42B and 42D. The distance between the curved sides, e.g. curved sides 40A and 40D decreases as the distance from the linear side 42A decreases. The conduit 250 used in Example 1 (see FIG. 11) can be used to apply the electrodepositable coating composition to the zinc film 35. In another non-limiting embodiment of Example 3, the segmented conduit disclosed in U.S. patent application Ser. No. 12/911,189 filed on Oct. 25, 2010 and shown in FIG. 13 is used.

Figure 13A:
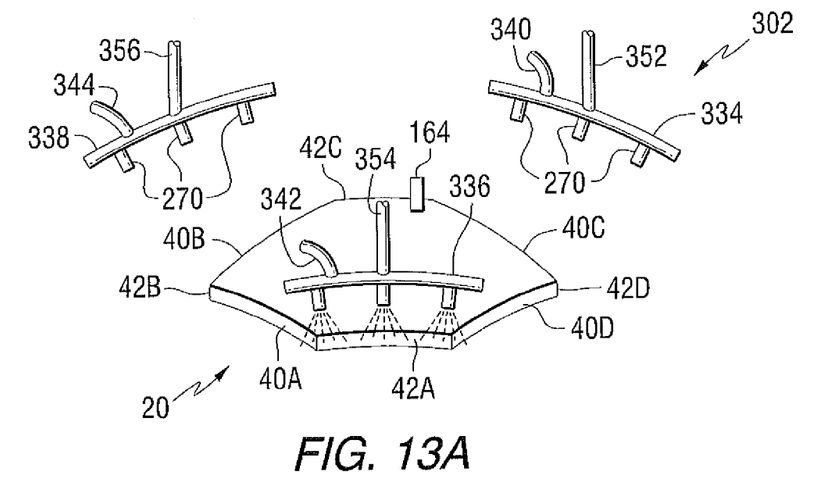
Figure 13B:
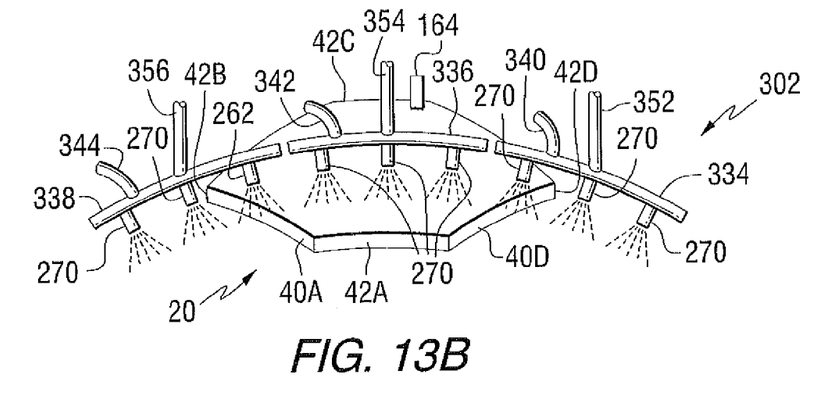
Figure 13C:
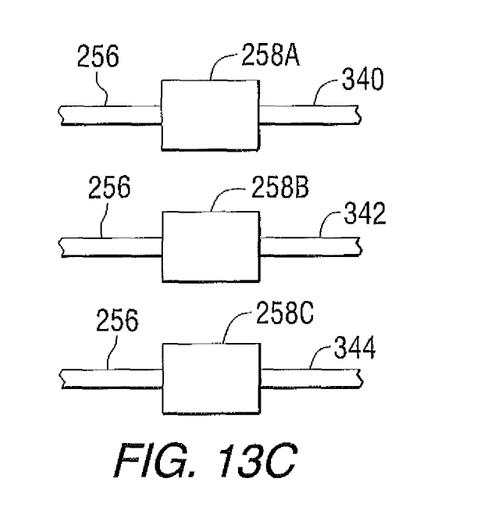

With reference to FIG. 13, conduit 302 includes segments 334, 336 and 338 connected by tubing 340, 342 and 344, respectively to its respective one of the system regulating devices 258A, 258B and 258C (FIG. 13C). Each of the segments 334, 336 and 338 of the conduit 302 is connected to an elevator shaft 352, 354 and 356, respectively (see FIGS. 13A and 13B). With reference to FIG. 9, the conduit 302 is set above the conveyor belt 240 of the conveyor 212 at an initial position, e.g. at a distance greater than the height of the solar mirror 20 supported on the conveyor belt 240. The clamping device 164 and the layer 92 of the electrically conductive paste is applied to a linear side, e.g. the linear side 42C of the solar mirror 20 as discussed above in Example 1. The opposite linear side 42A is the leading edge of the parabolic solar mirror 20. As the solar mirror 20 moves toward the flow curtain 262 from the conduit 302, the elevator shaft 354 moves the center segment 336 of the conduit 252 toward the conveyor belt 240 and stops at a distance from the belt 240 such that the segment 336 is spaced a predetermined distance above the leading edge 42A of the solar mirror 20 (see FIG. 13A), e.g. about 25 mm above the leading edge 42A of the mirror 20. The system regulating device 258B of the center segment 336 is activated to move the electrodepositable coating composition 270 through the nozzles 270 of the center segment 336 onto the leading edge 42A of the solar mirror 20. As the conveyor belt 240 continues to move the mirror 20 along the path 241, the elevator shaft 354 moves the center segment 336 of the conduit 302 away from the conveyor belt 240 to maintain the spaced distances of 25 mm from the mirror 20. As the mirror 20 moves along the path 241, the width and height of the mirror 20 increases. The elevator shafts 352 and 356 of the outer segments 334 and 338, respectively of the conduit 302 move downward toward the conveyor belt 240, and the system regulating devices 258A and 258C (see FIG. 13C) of the segments 334 and 336, respectively, are activated. As the segments 334 and 338 move toward the conveyor belt 240, the elevator shaft 354 moves the segment 336 away from the conveyor belt 240 as the height of the solar mirror 20 increases as it moves under the segment 336 of the conduit 302. The segments 334, 336 and 338 are aligned with one another to provide the conduit 302 (FIG. 13B) and move away from the conveyor belt 240 as needed to maintain the 25 mm spacing between the conduit 302 and the convex surface 26 of the solar mirror 20. After the linear sides 42B and 42D of the solar mirror 20 (see FIG. 13B) pass under the conduit 302, the segments 334, 336 and 338 of the conduit 302 move toward the conveyor belt 240 as the height of the solar mirror 20 decreases. As the width of the solar mirror 20 as measured between curved sides 40B and 40C decreases to a length less than the length of the center segment 336, the system regulating devices 258A and 258C of the segments 334 and 338, respectively are deactivated, and the elevator shafts 352 and 356 move the segments 334 and 338 to the initial or starting position.

Continuing the coating operation, one of two coating techniques is practiced. In one coating technique, the linear side 42C of the solar mirror 20 moves past the segment 336 of the conduit 302. The contact device 164 and the layer 92 are removed from the linear side 42C of the solar mirror 20. The uncoated surface under the layer 92 is cleaned, e.g. with denatured alcohol, and the layer 92 and the clamping device 164 are applied to the linear side 42A of the solar mirror 20. The solar mirror 20 is placed on the conveyor belt 240 with the linear side 42C as the leading edge. The coating process is repeated to apply a second coat over the reflective layer of the solar mirror and to coat the uncoated conductive surface that was under the layer 92. The second coating technique discontinues the coating process after the linear sides 42B and 42D of the solar mirror 20 move past the conduit 302. The contact device 164 and the layer 92 are removed and positioned at the linear end 42A of the solar mirror 20. The uncoated zinc coating 35 that was under the layer 92 at the linear side 42O of the solar mirror 20 is cleaned, and the uncoated portion of the zinc film 35 is coated as discussed above.

As can be appreciated, features of one Example can be modified to include features of other Examples. Further as can be appreciated, the practice of the invention can be used with any type of conduit made of electrically conductive material. Accordingly, a spray nozzle, pipe nipple, or any other type of aperture (e.g., slit) can be used to apply the liquid materials onto the conductive surface 38. It should be noted that the process parameters for applying the various liquid materials onto the conductive surface of the solar mirror will be dependent upon the shape of the conductive surface and, therefore, different types and shapes of apertures and/or nozzles can be used to apply the liquid materials onto the conductive surface 38 of the solar mirror 20.

The thickness of the electrodepositable coating composition, e.g. the protective e-coat film 36, deposited on the conductive surface 38 of the solar mirrors is dependent upon the user's needs as well as the shape of the solar mirror, e.g. the degree and extent of exposure of the reflective coating 28 to the hostile environment. For example and not limiting to the invention, the longer the exposure and/or the more hostile the environment, the thicker the protective e-coat film 36 deposited over the reflective coating 28. In some embodiments of the inventions, the wet and/or dry film thickness of the e-coat film 36 will range from 1 micron to 150 microns.

While any number of methods can be used to convey the solar mirrors 20, 57 and 62 through the flow curtain, it is noted that the actual apparatus used to convey the solar mirror does not ground the conductive surface 38. In other words, any apparatus can be used to convey the solar mirror through the flow curtain so long as the portion of the apparatus that contacts the conductive surface of the substrate is electrically isolated from the conductive surface of the solar mirror being coated, e.g. but not limited to the discussion, the portion of the apparatus that contacts the conductive surface 38 of the mirror is non-conductive nor grounded or electrically connected to an apparatus that is grounded.

Additional non-limiting embodiments Examples 1-3 of the invention include moving both the flow curtain and the solar mirror; maintaining the solar mirror in a stationary position and moving the flow curtain over the solar mirror, and coating only the uncoated area under the layer 92, e.g. moving a roller soaked with the electrodepositable coating composition and electrically connected to a terminal of the rectifier over the uncoated area.

As can now be appreciated, the use of the electrically conductive contact arrangement 158 (FIG. 7) of the invention is not limited to its use with a flow curtain of an electrodepositable coating composition, and the arrangement 158 can be used with a pool of an electrodepositable coating composition. More particularly and with reference to FIG. 14, in Example 4, a polypropylene container 370 was filled with 112 POWERCRON® 935 cationic acrylic electrocoat paint to provide a pool 372 of the electrocoat paint. An electrode 374 was placed in the pool 372, and the electrode 374 is connected to positive terminal 86 of the rectifier 82 by the wire 254A (see FIGS. 6 and 14). The binder clip 72, e.g. of the type shown in FIG. 5 and sold by ACCO Office Products was connected to the mirror 57. More particularly, leg 74 of the clip 72 was biased against the surface 59 of the glass substrate 58, and leg 76 of the clip 72 was biased against the electrically conductive surface 38 of the zinc film 35 on the reflective coating 28. Center leg 78 of the binder clip 72 was connected to negative pole 80 of a 500 direct current rectifier 82 (see FIG. 6) by wire 84A. The solar mirror having the binder clip 72 was placed in the pool 372.

Figure 14:
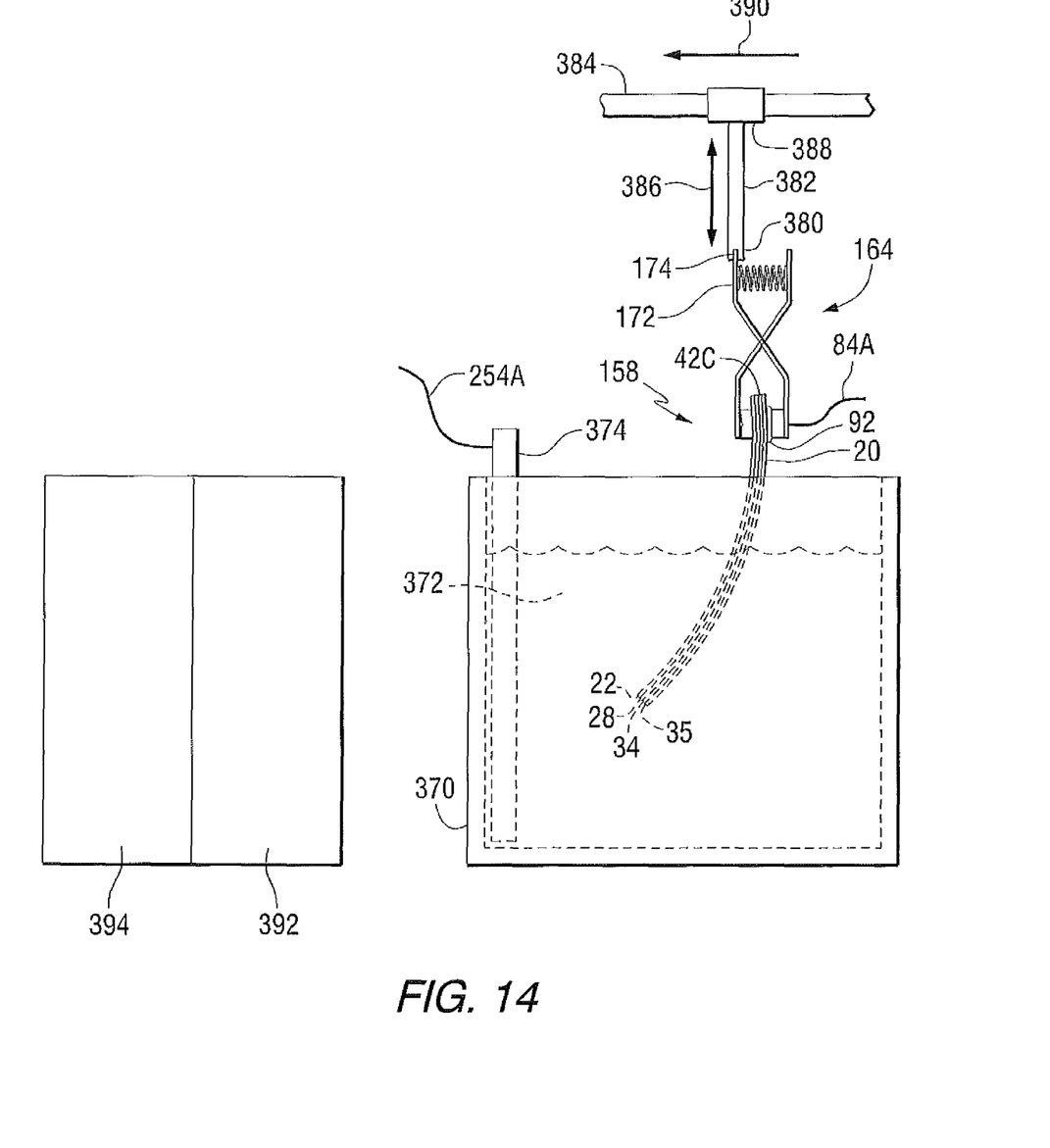
FIG. 14 is a side elevated view of an e-coating arrangement to coat a solar mirror in accordance to the teachings of the invention.

A voltage was applied to the electric system (the electric system included the electrode 374, the pool 372 of the electrodepositable coating composition, and the binder clip 72) to apply the protective coating 36 on the conductive surface 35. The solar mirror was moved through the pool 372 of the electrodepositable coating composition. Arcing was observed during the coating process and after the binder clip 72 was removed from the mirror 57, it was observed that the conductive surface 38 contacted by the leg 76 of the clip 72 was melted. It was surmised that the arcing and melting of the conductive surface 38 under the leg 76 of the binder clip 72 was the result of edge 88 of the leg 76 of the binder clip 72 having the missing portion 90 which increased the current density applied to the conductive surface 38.

In Example 5, the setup of Example 4 was used and the layer 92 of a malleable material (shown in phantom in FIG. 5) having conductive carbon of the type sold MG Chemicals 846-80G between the conductive surface 38 and the leg 76 of the binder clip 72 to fill in the areas 90 with the layer 92. The coating process of Example 4 was repeated. There was no arcing observed and when the binder clip was removed, the conductive surface 35 under the layer 92 was not melted, e.g. the conductive surface had a pristine appearance.

In Example 6, the layer 92 and contact device 184, i.e. the electrically conductive contact arrangement 158 of the invention are mounted on the linear side 42C of the solar mirror 20 as discussed above in Example 3.

With continued reference to FIG. 14, one leg of the clamping device 164, e.g. but not limiting to the invention, the end portion 174 of the leg 172 is secured to an end portion 380 of a shaft 382 mounted on conveyor 384 to move along a horizontal reciprocating path 386. Elevator mechanism 388 is mounted to the conveyor 384 to move the elevator mechanism 388, the shaft 382 and the solar mirror 20 along a vertical reciprocating path 390 toward and away from the pool 372. In one non-limiting embodiment of the invention, the conveyor 384 is moved along the path 386 to position the mirror 20 above the pool 372; the elevator mechanism 388 is energized to move the shaft 382 toward the pool 372 in the tank 370 to submerge the mirror 20 into the pool 372 of the electrodepositable coating composition up to a positioned spaced from the contacting device 164. The elevator mechanism 388 is de-activated and the 500 volt rectifier 82 (see FIG. 6) is energized to apply the protective layer 35 to the conductive surface 38. The conveyor 384 moves along the path 390 to move the solar mirror 20 through the pool of the electrodepositable coating composition 372 to stir the electrodepositable coating composition 372 while applying the protective film 36 to the electrically conductive surface 38. After 1 to 2 minutes the rectifier 82 is de-energized, and the elevator mechanism 388 is activated to move the shaft 382 away from the tank 370 to remove the mirror 20 from the pool 372 of the electrodepositable coating composition. The contact device 164 is removed from the mirror 20 and the uncoated area cleaned with denatured alcohol. The layer 92 and the contact device 164 are positioned on the protective layer 35 spaced from the uncoated area, and the uncoated area coated in any of the manners discussed above.

As can be appreciated the invention contemplates coating a portion of the conductive surface, removing the clip arrangement 164; placing it on the opposite end portion of the solar mirror 20, and submerging the uncoated portion of the conductive surface 38 in the electrodepositable coating composition to completely coat the conductive surface 38. After the conductive surface 38 of the mirrors 20, 37 and 62 are coated with the protective layer 35, using any of the above discussed non-limiting embodiments of the invention, the mirror having the protective layer 35 is preferably moved through a rinse station 392 and then a curing station 394.

As can now be appreciated, although the electrically conductive contact arrangement of the invention was discussed to apply the protective coating to the reflective coating of solar mirrors, the invention is not limited thereto, and the contact arrangement of the invention can be used in any e-coating process to electrically connect any articles, e.g. threaded rods, sheet metal, metal covered plastic articles to an electrical power supply.

While specific embodiments of the invention have been described in detail, it will be appreciated by those skilled in the art that various modifications and alternatives to those details can be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A coating apparatus for applying an e-coat over an electrically conductive contoured surface of an article, the apparatus comprising:
   an arrangement for applying an electrodepositable coating composition having an electrical conductivity over the conductive contoured surface of the article, and
   an electrically conducting contact device comprising a pair of jaw members biased toward one another, wherein at least one of the jaw members comprises an electrically conductive malleable material.

2. The coating apparatus according to claim 1, wherein the arrangement for applying of an electrodepositable coating composition is selected from one of the following:
   (A) an electrically conductive conduit for directing a flow curtain of the electrodepositable coating composition having the electrical conductivity toward a coating area, wherein the conduit is connected to an electrical power source, and the contact device is connected to the electrical power source, and
   (B) a container for containing a pool of the electrodepositable coating composition having the electrical conductivity; an electrode positioned in the container, wherein the electrode is connected to an electrical power source, and the contact device is connected to the electrical power source.

3. The coating apparatus according to claim 2 wherein the at least one of the jaw member is a first jaw member and the other jaw member is a second jaw member, wherein the second jaw member comprises a support device comprising a platform and a support plate, wherein the support plate and the platform are joined together by a ball and socket joint.

4. The coating apparatus according to claim 3, wherein the contact device comprises a first elongated shaped member having a first end portion and an opposite second end portion, wherein the second end portion has the first jaw member; a second elongated shaped member having a third end portion and an opposite fourth end portion, wherein the fourth end portion has the second jaw member; the first member and the second member pivotally joined together, wherein the first member and the second member are shaped and pivotally joined together such that moving the first end portion and the third end portion away from one another moves the support plate of the support device and the electrically conductive malleable material toward one another, and moving the first end portion and the third end portion toward one another moves the support plate and the electrically conductive malleable material away from one, and
   comprising a biasing member acting on the first member and second member to bias the first jaw member and the second jaw member toward one another.

5. The coating apparatus according to claim 4, wherein the electrically conductive malleable material is mounted on a first surface of an electrically conductive structurally stable member and an opposite second surface of the stable member is secured to the second end portion of the first member.

6. The coating apparatus according to claim 5, wherein the electrical power source is an electrical direct current power source,
   wherein the conduit is connected to a positive terminal or a negative terminal of the power source, and the stable member of the first jaw member is electrically connected to the negative terminal of the power source when the conduit is electrically connected to the positive terminal of the power source, and the stable member is electrically connected to the positive terminal of the power source when the conduit is electrically connected to the negative terminal of the power source, and
   wherein the electrode is connected to a positive terminal or a negative terminal of the power source, and the stable member of the first jaw member is electrically connected to the negative terminal of the power source when the electrode is electrically connected to the positive terminal of the power source, and the stable member is electrically connected to the positive terminal of the power source when the electrode is electrically connected to the negative terminal of the power source, and
   comprising the stable member mounted in a housing having an open end to access the first surface of the stable member to make electrical contact with the electrically conductive malleable material.

7. The coating apparatus according to claim 6 wherein outer surface of the housing electrically non-conductive.

8. The coating apparatus according to claim 6, wherein the article is a solar mirror and the coating apparatus applies an electrically conductive coating over a first surface of a solar reflective coating of the solar mirror, wherein the solar mirror comprises a substrate having a first major surface and an opposite second major surface, the reflective coating having a second surface opposite to the first surface, wherein the second surface of the reflective coating is on one of the major surfaces of the substrate, and the first surface of the reflective coating is electrically conductive, the coating apparatus comprising:
   the conduit and the contact device;
   a conveying system, and
   a motor for moving the conduit and the conveying system relative to one another, and
   a supply system for moving the electrodepositable coating composition to the conduit to provide a flow curtain of the composition when the supply system is operating.

9. The coating apparatus according to claim 8, wherein the conduit has openings through which the electrodepositable coating composition flows.

10. The coating apparatus according to claim 9, wherein
the conveyor system comprises a conveyor belt having holes through which the electrodepositable coating composition can flow and a container to collect the electrodepositable coating composition flowing through the conveyor belt, and
the conduit arrangement comprises three segments, each segment mounted for movement toward and away from the conveyor belt.

11. A method of applying an e-coat over an electrically conductive contoured surface of an article, the method comprising:
moving an electrodepositable coating composition having an electrical conductive over the electrically conductive contoured surface;
providing a pair of jaw members;
providing a layer of a malleable electrically conductive material on a surface of a first jaw member of the pair of jaw members;
biasing the first jaw member against the electrically conductive surface of the article to bias the layer against the electrically conductive surface of the article;
moving the electrodepositable coating composition over the conductive surface to establish a current path, wherein the current path comprises the electrodepositable coating composition, the conductive surface of the substrate, the layer and the first jaw member of the pair of jaw members, and
moving an electric current along the current path to deposit the coating on the electrically conductive surface in contact with the electrodepositable coating composition.

12. The method according to claim 11 wherein the article is a solar mirror and the moving the electrodepositable coating composition over the contoured conductive surface of the solar mirror is accomplished by one of the following procedures:
(A) positioning an electrically conductive conduit having outlets over the electrically conductive surface wherein the flow of the electrodepositable coating composition through the outlets is adjusted to provide a flow curtain extending from the conduit to the conductive surface of the solar mirror, and
(B) providing a container having the electrodepositable coating composition and an electrode in the electrodepositable coating composition, and submerging the solar mirror in the electrodepositable coating composition.

13. The method according to claim 12, wherein the first jaw member has an electrically conductive surface having an area defined as a first area in facing relationship to the contoured surface of the solar mirror, and the layer of the malleable electrically conductive material covers an area of the contoured surface of the solar mirror defined as a second area, wherein after the moving the current is practiced the second area is uncoated and the uncoated second area is equal to or greater than the first area.

14. The method according to claim 13 wherein the first area is less than a square foot, the electric current is in the range of greater than 0 to 48 inches, the first area is greater than 0 and equal to or less than 3 square inches, and the current density at the surface of the metal member is 0.1 to 0.5 ampere/square inch.

15. The method according to claim 12 wherein the solar mirror and the electrodepositable coating composition are moved relative to one another and comprising:

after moving the electric current is practiced, removing the first jaw member and the layer from the conductive surface of the solar mirror;
positioning a second layer of electrically conductive material and the first jaw member on the protective coating applied on the electrically conductive coating of the solar mirror;
flowing electrodepositable coating composition over uncoated area of the conductive surface of the solar mirror; and
moving the electric current through the electrically conductive surface to coat the uncoated electrically conductive surface of the solar mirror.

16. The method according to claim 15, wherein the electrically conductive surface of the solar mirror is a first surface of a solar reflective coating, the solar reflective coating having a second surface opposite to the first surface;
the solar mirror having a first surface and an opposite second surface, wherein the first surface of the solar mirror is designated to face a source of solar energy, and the second surface of the reflective coating is on the second surface of the solar mirror, and the coating is a curable protective coating, comprising curing the protective coating.

17. The method according to claim 16, wherein the solar mirror has a concave first surface and a convex second surface.

18. The improved method according to claim 12, wherein the procedure (A) is practiced and the solar mirror has a first end, an opposite second end, a first side, an opposite second side, and a location between and spaced from the first and the second ends, wherein the width as measured between the first side and the second side increases as the distance from the first end toward the location increases, and the distance between the first side and the second side decreases as the distance from the location toward the second end increases; comprising moving the solar mirror through the flow curtain wherein length of the flow curtain increases as the flow curtain moves toward the location of the solar mirror, and the width of the flow curtain decreases as the curtain moves from the location of the solar mirror toward the second end of the solar mirror.

19. The method according to claim 12 wherein the procedure (B) is practiced, comprising:
electrically connecting the electrode to a first conductive pole of a power supply;
electrically connecting the first jaw member to a second conductive pole of the power supply;
energizing the power supply to deposit a coating of the electrodepositable coating composition on the conductive surface;
removing the contact device and the layer from the solar mirror;
providing a second layer of a malleable electrically conductive material on a surface of the first jaw member;
biasing the first jaw member toward a surface of the coating to bias the layer against the surface of the coating; and
moving the current through the electrodepositable coating composition to apply the electrodepositable coating composition over uncoated surface of the conductive surface of the solar mirror.

20. The method according to claim 19, wherein the conductive surface of the solar mirror is the surface of a reflective coating of the solar mirror.

* * * * *